Nov. 3, 1936.  E. C. HORTON  2,059,457
ACCESSORY SYSTEM
Filed March 22, 1935
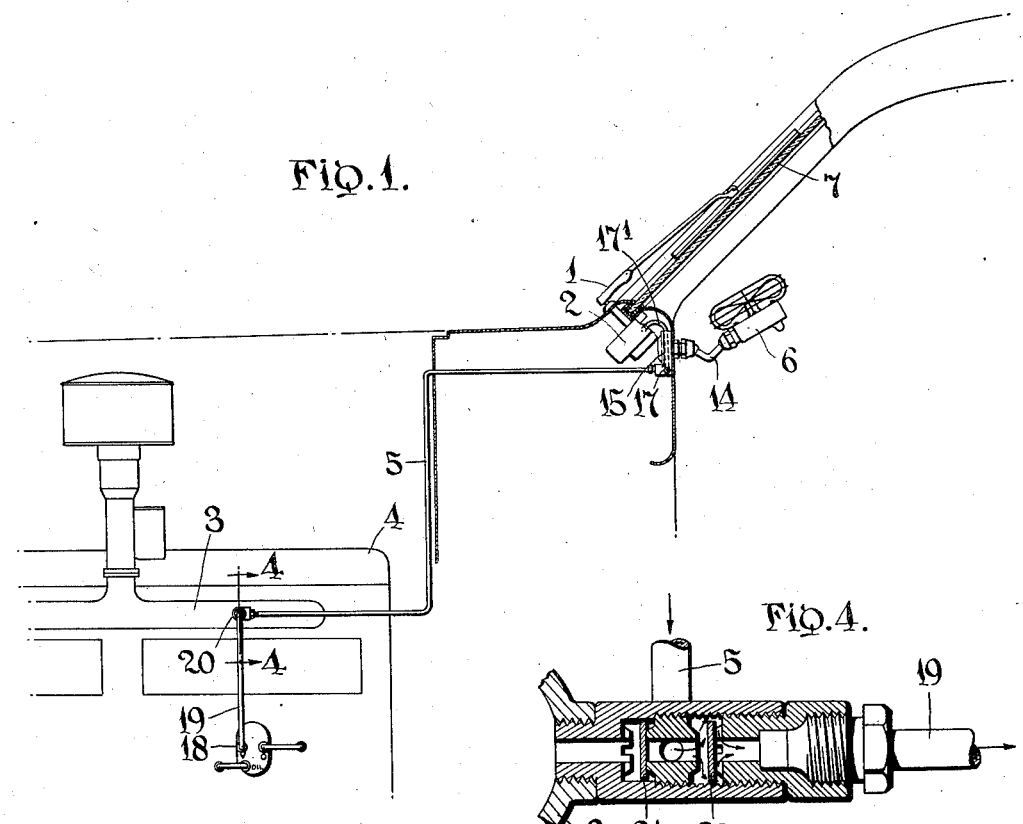
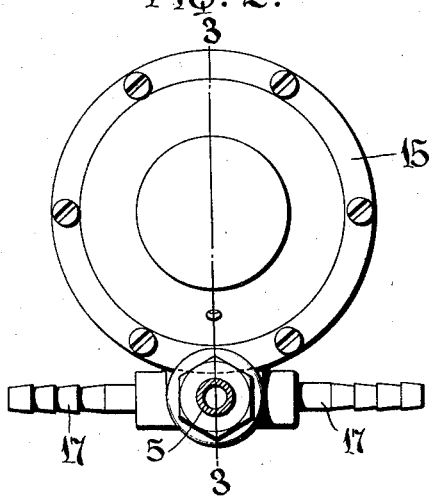
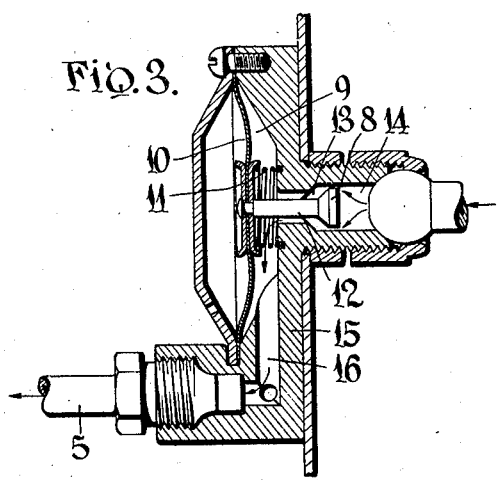
INVENTOR
Erwin C. Horton,
BY
Beau, Brooks, Buckley & Beau.
ATTORNEYS Patented Nov. 3, 1936

2,059,457

UNITED STATES PATENT OFFICE 2,059,457

ACCESSORY SYSTEM

Erwin C. Horton, Hamburg, N. Y., assignor to Trico Products Corporation, Buffalo, N. Y.

Application March 22, 1935, Serial No. 12,523

3 Claims. (Cl. 60—60)

This invention relates to an accessory system for motor vehicles.

The present day automobile is found equipped with a windshield cleaner which is operated by the low pressure or suction influence maintaining in the intake manifold of the motor vehicle engine. This suction varies with a change in engine throttle position, and at times is far in excess to that required for proper operation of the windshield cleaner, while at other times, as when the engine throttle is fully opened, the supply of suction is very meager. Of late other motor vehicle accessories have been devised for being operated by low pressure, and when these are in communication with the source of suction, the available pressure may be insufficient to operate satisfactorily both the windshield cleaner and such additional accessory. This is especially true when the source of pressure is limited in its supply, as is the intake manifold of the internal combustion engine.

Accessories vary in their importance. It is an object of the present invention to provide an accessory system for motor vehicles (having two or more accessories) which will permit the more important one of the accessories to be maintained fully operative in preference to the other or secondary accessory.

In the drawing—

Fig. 1 is a fragmentary showing of a motor vehicle having an accessory system embodying the present invention.

Fig. 2 is an elevation of the accessory coupler;

Fig. 3 is a sectional view about on line 3—3 of Fig. 2, and

Fig. 4 is a sectional view about on line 4—4 of Fig. 1.

Referring more particularly to the drawing, the windshield cleaner 1 is provided with a suction operated motor 2 which may be of the type shown in Patent No. 1,565,493, granted December 15, 1925 to John R. Oishei and Erwin C. Horton. The numeral 3 indicates the source of pressure which may be positive or negative. Herein it is the intake manifold of the internal combustion engine 4, communication between the windshield cleaner motor 2 and the intake manifold being established by a conduit 5. For ease of description the windshield cleaner may be termed the primary or more important accessory.

The numeral 6 designates another suction operated accessory of secondary importance and which may be in the form of a fan embodying a motor construction in accordance with Patent No. 1,745,114, granted January 28, 1930 to John R. Oishei and Henry Hueber. This fan may be disposed at the rear side of the windshield 7 so as to direct its stream of air across the window surface for removing moisture therefrom. It is obviously preferable to have the windshield cleaner operate rather than the secondary accessory when the suction influence from the manifold is low and insufficient to effectively operate both accessories concurrently. In certain kinds of weather a condition may arise wherein the operation of the fan may be preferred to the operation of the windshield cleaner and, therefore, it is not the intention to restrict the preferred accessory to the windshield cleaner in the claims.

According to the present invention, means are provided for interrupting communication between the source of pressure 3 and the secondary accessory 6 when the available pressure is insufficient to operate both accessories properly. This means as illustrated herein embodies an automatic valve 8 which is moved to an open position in response to a pressure sufficient to operate both accessories in an efficient manner. For this purpose there is provided a chamber 9 which is in communication with the suction passage 5 and provided with a movable wall 10 that is normally urged to a chamber enlarging position by a spring 11. The tension of this spring is adapted to be counteracted by a predetermined low pressure or high degree of suction, in the presence of which the wall 10 will move to a chamber ensmalling position and thereby disengage the valve 8 from its seat, being connected thereto by stem 12. The branch passage 14 to the secondary accessory is thus opened for the operation of the latter.

As the degree of available suction falls and the resistance to the urge of the spring 11 is diminished, the latter will move the wall 10 to its chamber enlarging position and cause the valve 8 to engage its seat thereby closing the communication with the secondary accessory and placing the entire source of pressure at the sole command of the primary accessory.

The coupler casing 15, in which the chamber 9 is formed, has a passage 16 leading from the chamber to the main passage 5. One or more nipples 17 extend from the casing 15 for being connected to a like number of windshield cleaners or other accessories, as by a hose 17'.

For providing a more adequate supply of low pressure, a suction pump, generally indicated at 18, has its inlet side connected to the passage 5 by a conduit 19 and a T-coupling 20. The T-coupling is also connected to the intake manifold, suitable check valves 21 and 22 acting to close off either of the two sources of suction when deficient.

From the foregoing it will be observed that the primary accessory is always in constant communication with the source of suction and that the secondary accessory is in communication with such source only when the available pressure or suction is sufficient to operate both accessories in an efficient manner.

What is claimed is:

1. An accessory system for motor vehicles connected to a source of low pressure in the power plant thereof, wherein the rise and fall in the pressure influence occurs incidental to vehicular operation, a primary suction operated accessory having constant communication with said source, a secondary suction operated accessory having intermittent communication with said source, and pressure responsive means operable for automatically establishing communication between the secondary accessory and the source when the pressure available therefrom is sufficient to operate both accessories and for automatically closing such communication when the pressure influence is insufficient to operate both accessories.

2. The combination with a motor vehicle power plant having a source of variable suction influence, wherein the suction influence varies incidental to vehicular operation, a primary suction operated accessory having a constant communication with said source, and a secondary suction operated accessory also having communication with said source, of pressure responsive means for opening and closing the communication between said secondary accessory and said source according to the available pressure influence whereby to maintain the primary accessory operative in preference to the secondary accessory.

3. An accessory system for motor vehicles adapted for connection to a source of low pressure such as the intake manifold of a motor vehicle internal combustion power plant, in which manifold the suction influence varies according to the throttle position, a primary suction operated accessory having communication with said source, a secondary suction operated accessory having communication with said source, a valve normally closing the communication between said secondary accessory and the source, and means responsive to a pressure influence of a substantially predetermined degree for opening the valve to render the secondary accessory operative and in the absence of such pressure influence to close the valve to render such secondary accessory inoperative whereby the primary accessory is given a preference over the secondary accessory.

ERWIN C. HORTON.